United States Patent [19]

Bishop

[11] 4,042,660

[45] Aug. 16, 1977

[54] MOTTLED APPEARANCE INJECTION MOLDING METHODS

[75] Inventor: Thomas G. Bishop, Mount Gilead, Ohio

[73] Assignee: HPM Corporation, Mount Gilead, Ohio

[21] Appl. No.: 649,063

[22] Filed: Jan. 14, 1976

Related U.S. Application Data

[62] Division of Ser. No. 382,500, July 25, 1973, Pat. No. 3,945,786.

[51] Int. Cl.² .............................................. B29F 1/12
[52] U.S. Cl. .................................... 264/77; 264/245; 264/328; 264/329
[58] Field of Search ................. 264/77, 245, 328, 329, 264/73, 75

[56] References Cited

U.S. PATENT DOCUMENTS

| | | | |
|---|---|---|---|
| 2,271,063 | 1/1942 | De Mattia | 264/77 X |
| 2,279,344 | 4/1942 | Reid | 264/77 |
| 3,130,452 | 4/1964 | Heumann | 425/198 |
| 3,146,287 | 8/1964 | Albers | 264/329 |
| 3,228,997 | 1/1966 | Armstrong | 264/77 X |
| 3,807,925 | 4/1974 | Lohmann | 425/245 R |

Primary Examiner—Richard R. Kucia
Attorney, Agent, or Firm—Burns, Doane, Swecker & Mathis

[57] ABSTRACT

A molding system for producing articles of mottled appearance includes a plasticizing unit having an inner bore which communicates with a mold cavity. A feed screw is mounted within the bore and is connected to fluid-actuated motors for rotary and translational movement within the bore. A spreader device is positioned in a heated part of the bore ahead of the feed screw. The screw is rotated to feed and soften molding materials of diverse coloration and is subsequently translated to push the materials through the spreader device such that final plasticization occurs. A bridging conduit is provided between the rotary and translational motors to divert a controlled amount of fluid from the latter to the former during a pushing operation, to rotate the screw forwardly at a controlled rate or to hold pressure on the screw to prevent backward rotation or to limit the amount of backward rotation.

1 Claim, 3 Drawing Figures

MOTTLED APPEARANCE INJECTION MOLDING METHODS

This is a division of application Ser. No. 382,500, filed July 25, 1973, now U.S. Pat. No. 3,945,786.

BACKGROUND AND OBJECTS OF THE INVENTION

This invention relates to improved methods and apparatus for injection molding of articles, such as rubber or plastic articles, having a mottled appearance.

One injection molding technique which has been heretofore employed involves the use of an injector unit of the type having a barrel and a plunger disposed for reciprocating movement within an inner bore of the barrel. The inner bore-defining surface of the barrel is heated, usually by means of heating bands which encircle the outer periphery of the barrel. By inserting molding materials of common or diverse coloration ahead of the plunger and then advancing the plunger, the materials are displaced toward the discharge orifice of the barrel. Contact with the heated surface of the bore causes the materials to become heated and plasticized. Material-spreading means might be employed in the barrel to increase the rate of heat exchange occurring between the material being displaced along the bore and the heated bore surfaces.

More recently, injection molding techniques have been somewhat revolutionized by the introduction of screw-type plasticating units.

The basic screw injector apparatus includes an elongated barrel and a screw which extends longitudinally through the barrel. The screw has a helical land or thread on its surface which cooperates with the internal surface of the barrel bore. The screw is rotated about its own axis to work the molding material and feed it toward the outlet end of the barrel. The working of material generates heat causing the material to melt as it progresses along the screw. Characteristic of screw-type injectors is an intense mixing of the materials which occurs during feeding, assuring that, upon reaching the end of the screw, the melt will be of substantially uniform temperature and consistency, and free of small gels and other fine-structure agglomerations.

Due to the superior performance of screw-type injectors over those previously utilized, especially involving such features as rate of plasticization, efficiency of heat transfer, degree of mixing, and overall melt quality, current high-production molding facilities rely heavily on such screw injector units.

Although screw injectors have been found highly advantageous in providing plasticated material having substantially homogeneous properties, such material may not be acceptable for the production of certain articles. For instance, the fabrication of articles having a mottled or marbled appearance requires that materials of diverse coloration must be melted and ejected without the occurrence of undue blending or dispersion of the colors. The intense material mixing and dispersion effected by screw injectors as conventionally constructed and utilized, would obviate the formation of such a color pattern. Hence, until now, the versatility of screw injectors has been somewhat limited.

It is, therefore, a general object of the invention to eliminate or minimize problems of the sort previously discussed.

It is a particular object of the invention to provide novel extrusion methods and apparatus for enabling screw injectors to effectively produce articles having a mottled appearance.

It is another object of the invention to maximize the versatility and efficiency of screw injector operation.

SUMMARY OF A PREFERRED EMBODIMENT OF THE INVENTION

A preferred form of the invention intended to accomplish at least some of the foregoing objects entails an injection molding system of the reciprocal screw type capable of producing articles having a mottled appearance. In this system, molding materials are heated within an injector and subsequently injected into a mold cavity. The injector includes a heated housing having an inner bore and a discharge opening. A feed screw having a helical land is disposed within the bore. A material-spreading structure is located within the bore ahead of the screw to facilitate the transfer of heat from the housing to materials passing through the spreader. Power mechanism is connected to the screw for respectively rotating and advancing the screw within the bore. This power mechanism is suitably actuated so as to rotate the screw to feed and work the materials, and then advance the screw forwardly to project the materials through the spreader structure and out the discharge opening.

In accordance with a preferred embodiment of the invention the effective length of the feed screw is dimensioned to feed and work molding materials of diverse coloration such that the materials are discharged from the screw in a softened condition having distinct color patterns. This is in contrast to conventional screw operation in which molding materials are heated and mixed to such a state that differently colored materials would be discharged from the screw in a substantially blended condition, almost devoid of discernable color patterns.

A suitable effective screw length may be provided, for example, by appropriately designing a screw, by removing flights from an existing screw, and/or by disposing a conventional screw within the housing such that a portion of the rearward flights are situated behind the feed opening.

The power mechanism for rotating and advancing the screw preferably comprises fluid-actuated rotary and translational motors. A bridging conduit may be provided which fluidly connects these motors. When the translational motor is actuated to advance the screw forwardly, the bridging conduit may be opened to divert pressurized fluid to the inlet side of the motor to apply torque to the screw in a direction opposite to that resulting from the back pressure of softened molding material upon the screw. The amount of fluid diverted to the rotary motor during a screw translating stroke may be controlled as desired to permit some reverse rotation of the screw, to hold the screw against rotation, or to rotate the screw in a forward direction.

THE DRAWINGS

Other objects and advantages of the present invention will become apparent from the subsequent detailed description thereof in connection with the accompanying drawings in which.

DETAILED DESCRIPTION OF A PREFERRED EMBODIMENT OF THE INVENTION

Figure 1:
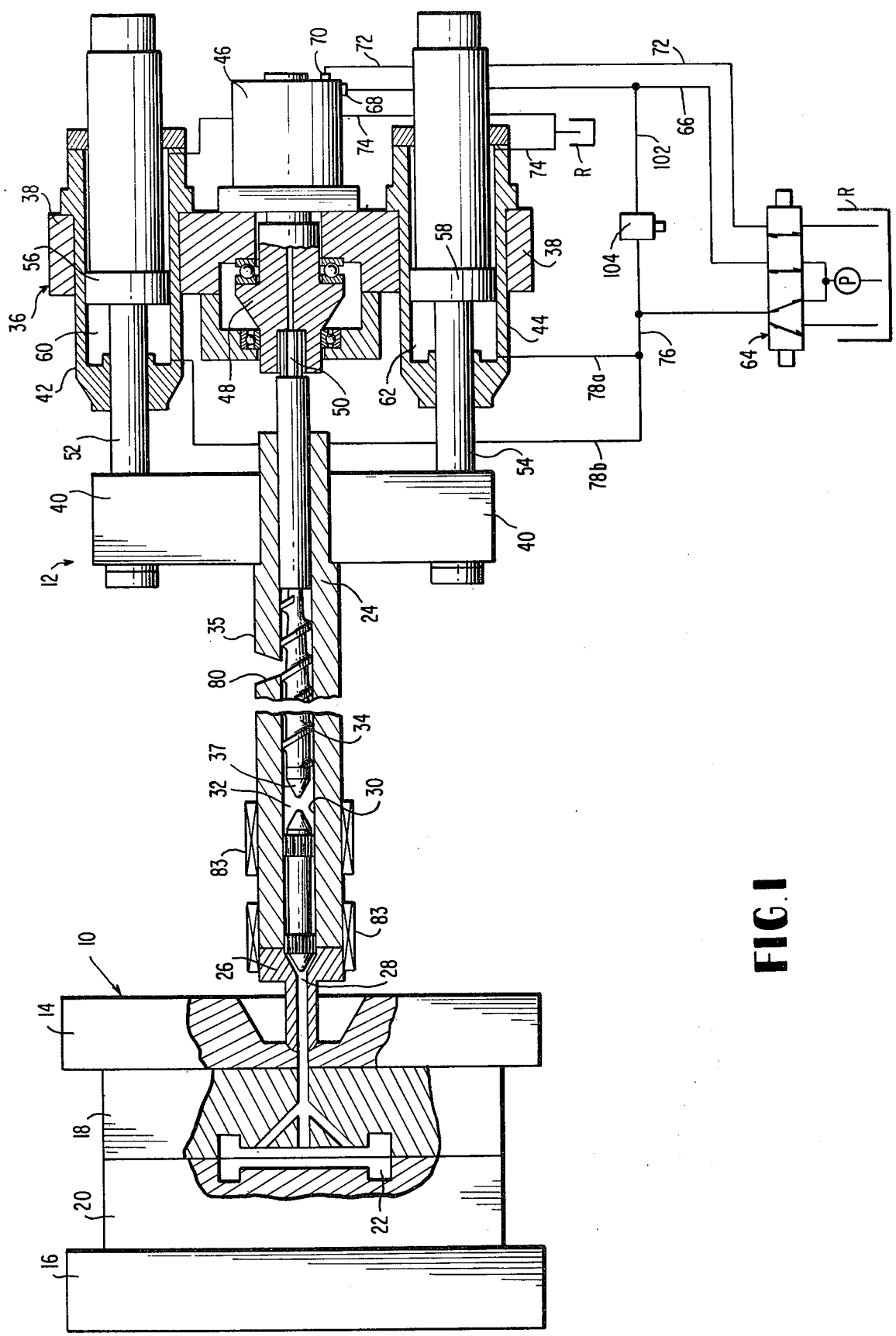
FIG. 1 is a schematic view, partly in longitudinal section, of a molding system according to the invention.

A preferred form of a novel molding apparatus is illustrated in FIG. 1 and includes a die unit 10 and an injector assembly 12. The die unit 10 includes a pair of platens 14 and 16 which carry a pair of die sections 18 and 20. The proximate faces of the die sections are configurated so as to define a mold cavity 22. The platens are relatively separable, such that the mold cavity 22 may be exposed to allow removal of a molded article therefrom.

The injector assembly 12 communicates with the mold cavity 22 and includes a stationary housing or barrel 24. At its forward end, the barrel includes a nozzle 26 having a discharge orifice 28. This orifice communicates with the mold cavity 22 by means of passages extending through the platen 14 and the die section 18.

The barrel 24 includes a cylindrical inner surface 30 which defines a cylindrical bore 32. Operably disposed within the barrel is a feed screw 34 which includes a helical land or thread 35, and a smear head 37 at the forward end thereof. The helical land cooperates with the bore surface 30 to define an elongated helical channel 35' for conducting molding materials, such as plastic or rubber for example. The feed screw is coupled to a power system suitable for producing rotational and translational movements of the screw. One such suitable power system comprises a fluid-actuated control mechanism 36.

The screw-actuating mechanism 36 includes a carriage 38 which is movably mounted relative to a stationary frame 40. The carriage 38 carries, at its outer ends, a pair of fluid-actuated translational motors 42 and 44. At its center, the carriage 38 carries a fluid-actuated rotary motor 46. These motors 42, 44, and 46 may be of the hydraulically-driven type, for example.

The output shaft of the rotary motor 46 is coupled to a rotation-transmitting element 48 which is rotatably mounted in suitable bearings within the central frame portion. At its forward end, the element 48 is provided with a splined socket which receives a rearwardly projecting splined tongue portion 50 of the screw 34. In this fashion, rotation of the rotary motor 46 is transmitted to the feed screw 34.

The hydraulic translating cylinders 42 and 44 include piston rods 52, 54 which are fixedly coupled to the stationary frame 40. The piston ends 56 and 58 of these rods are located within chambers 60 and 62 of the translating cylinders.

Actuating fluid is conducted to the motors 42, 44, 46, from a pump P. The pump draws fluid from a reservoir R and feeds it to a control valve 64. The control valve 64 is suitably configured, as a spool arrangement for example, to selectively direct fluid to the translating motors 42, 44 and the rotary motor 46. Thus, with the valve 64 in a screw-rotating posture, the pump P is placed in communication with a conduit 66 to deliver fluid to the inlet 68 of the rotary motor 46 in a manner rotating this motor forwardly. At the same time, the outlet 70 of this motor is fluidly coupled with the reservoir via conduit 72 to recirculate the fluid.

When the valve 64 is in a screw-translation posture, depicted in FIG. 1, the pump P is placed in fluid communication with the pistonrod side of the chambers 60 and 62 via conduits 76, 78a, and 78b. Pressurized fluid entering this portion of each chamber advances the carriage 38, and thus the screw 34, forwardly toward the discharge orifice 28. The piston sides of the chambers 60 and 62 may, at this point, be placed in communication with the reservoir by means of conduits 74. If desired, the valve 64 may be arranged for selectively providing communication between these piston sides and the pump to exert force in the screw-retracting direction as well.

To this point, a conventional screw-type injector has been described which may be utilized in accordance with known principles to plasticate stock materials. Thus, with the control valve 64 oriented to communicate the pump with the rotary motor 46, the screw can be rotated at a desired speed within the bore. At the same time, stock material introduced at the rearward end of the screw would be displaced forwardly to be heated and gradually plasticated by the screw.

During the build up of a charge, access from the discharge opening 28 to the mold cavity 22 may be blocked by suitable means. Thus, plasticated material discharged from the screw would accumulate ahead of the screw and exert back pressure against the screw to urge the screw rearwardly within the bore. Following production of a proper amount of charge, the discharge orifice can be unblocked, and the control valve shifted to a screw-advance posture to communicate the pump P with the cylinder chambers 60 and 62. Fluid which is fed to these chambers reacts against the stationary pistons 56, 58 and advances the carriage 36 and the screw 34 forwardly to inject the charge of melt through the then-unblocked discharge orifice.

As noted previously, however, the conventional screw injection systems are not well suited to the production of mottled articles due to the high degree of melting and mixing ordinarily obtained. When applied to a plurality of diversely-colored materials, this results in a substantial blending of the colors.

In accordance with the present invention, however, the screw injector system is constructed and operated in an unconventional manner whereby certain advantages of plasticator screws may be realized in a mottling operation without the occurrence of afore-mentioned disadvantages.

More particularly, this invention involves a screw arrangement which restricts the amount of work-input applied to the molding materials by the screw. When discharged from the screw, the materials will have been worked to a softened condition and will not have reached the degree of melting and mixing typified by conventional screw operation. This assures that the diverse color patterns of the molding materials will be kept distinct.

One preferred manner of reducing work-input from the screw to the materials, aside from fabricating a new screw, is depicted in FIG. 1 and involves a rearward displacement of the screw 34 relative to the barrel such that, at the initiation of a plasticating cycle, one or more of the rear flights of the thread 35 lies behind the material feed inlet opening 80. The result of this arrangement is a reduction in the effective working length of the feed channel, and thus a reduction in the total amount of work applied to these materials by the screw. In this fashion, the materials are discharged from the screw 34 in a softened condition, but not in a fully plasticized and mixed condition. Therefore, mottled color patterns of the materials will remain clearly discernable.

This effect may be also be accomplished, for example, by removing some of the front flights of the thread 34 which likewise shortens the working length of the channel 35'.

The amount by which the effective working length of the channel 35' is to be reduced is determined, for example, in accordance with the melting characteristics of the various molding materials being utilized.

Subsequent operation in the injector unit are directed toward further melting of the materials with minimal mixing thereof. Accordingly, the portion of the bore surface 30 ahead of the screw 34 is heated, preferably by a plurality of electrical heating bands 83 disposed in encircling relation to the barrel 24. The bands 83 thereby transform the part of the bore ahead of the screw into a heating chamber where further heating and melting of the molding materials is effected.

Positioned within the heating chamber ahead of the screw 34 is a spreader device designed to intensify heat transfer to the softened materials to further facilitate melting. A preferred form of spreader device comprises a "torpedo" 84, termed such because of its torpedo-like appearance.

Figure 2:
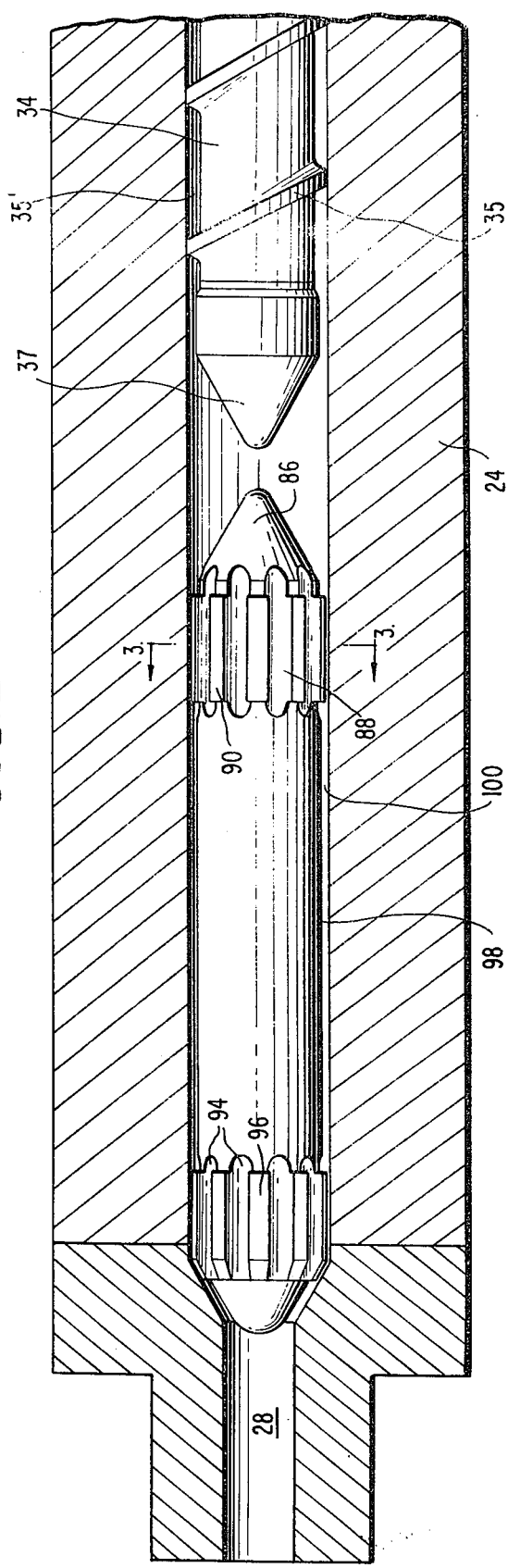
FIG. 2 is a longitudinal sectional view of a forward end portion of the molding injector.
Figure 3:
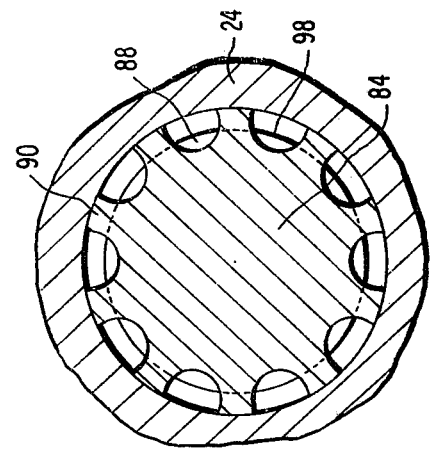
FIG. 3 is a cross-sectional view taken along line 3—3 of FIG. 2.

The torpedo 84 includes a conical rearward tip 86 which faces the smear head 37 of the feed screw, as depicted in FIG. 2. At the outer end of the rear conical tip 86 a plurality of longitudinal grooves 88 and radial fins 90 are arranged in circumferentially alternating fashion.

The forward end of the torpedo includes a conical front tip 92 and a plurality of longitudinal grooves 94 and radial fins 96 arranged in circumferentially alternating fashion.

Between the front and rear tips 86 and 92, the torpedo has a cylindrical outer surface 98 defining an annular passage 100 with the bore-defining surface 30 of the barrel 24.

The fins 90, 96 of the torpedo 84 function to center the torpedo within the bore and transmit heat from the bore surface 30 to the outer torpedo surface 98.

With a charge of softened materials being disposed between the screw and the torpedo, forward advancement of the screw serves to push these softened materials through the torpedo. As a result, the materials are heated and plasticized to a desired consistency for injection into the mold 10.

The resistance to flow of material through the restricted passage 100 established by the torpedo 84 and out into the mold may be high and there is therefore a tendency for the material to flow backwardly relative to the feed screw 34 as the latter is being translated forwardly. Such backward slippage of material undesirably reduces the amount of the charge or shot which is ultimately injected. The present invention features means for resisting material back-flow so as to facilitate the injection of a full shot.

This is accomplished preferably by the use of a bridging conduit 102 connected between the feed line 76 and the rotary motor input line 66, as may be seen in FIG. 1. Disposed within the bridging conduit 102 is a selectively actuable valve 104, which is operable to admit a desired amount of fluid flow through the bridging conduit. In this fashion, pressurized fluid which would otherwise be fed to the translating motors 42 and 44 is diverted, in controlled amounts, to the inlet side of the rotary motor 46 to regulate the rotary behavior thereof in a manner to oppose back-flow of the material being injected. In some instances, satisfactory performance can be achieved even though rearward rotation of the screw is not completely prevented but is rather resisted and slowed down. In other instances, it will be desirable to divert sufficient fluid to hold the screw against reverse rotation or to impart a forward rotation to the screw during its injection stroke. The particular conditions best suited to a particular operation may be obtained by appropriate adjustment or regulation of the valve 104.

In accordance with the invention, the bridging conduit 102, in lieu of being connected as shown in FIG. 1, could be connected in any suitable manner for directing pressurized fluid from the pump P to the inlet side of the rotary motor 46. For example, this valved conduit could be connected directly to a pump outlet with access to the rotary motor being prevented until such time as the screw is being advanced.

OPERATION

Prior to the initiation of an injection cycle, the screw 34 is arranged to define with the bore 32 a working channel 35' having an effective length dimensioned to transform molding materials into a generally softened condition. This arrangement can be accomplished, for example, by displacing the screw 34 rearwardly relative to the feed opening 80, as shown in FIG. 1, or by removing front flights from the thread 35, or by a combination of both expedients.

A batch of diversely-colored molding materials is fed into the barrel through the opening 80. With the valve 64 in a screw-rotation position, the screw is rotated forwardly by the rotary motor 46 to displace the materials forwardly within the channel 35'. The materials are heated as they are mechanically worked by the screw and are progressively softened. Due to the unusually short span of the working channel 35', however, the materials are discharged from the screw tip while in a softened condition, having been plasticated by an amount less than that normally produced by conventional screw operations. By merely softening the materials, the diverse color patterns thereof remain distinctly discernable at this point, not having become blended into a single color as would be caused by standard screw operation.

Accumulation of these softened materials discharged ahead of the "softener" screw 34 results in the screw being urged rearwardly within the bore. After a sufficient charge has been softened by the screw, the valve 64 is shifted to a screw-advance position. Pressurized fluid is delivered to the translational motors 42, 44 through conduit 76 and the screw is translated forwardly within the bore in the manner of a ram to push the materials through the torpedo 84. The materials are spread outwardly by the torpedo into a thin layer within the annular passage 100. Accordingly, heat is transferred to the materials from the heated torpedo and the heated bore surface 30 in amounts sufficient to transform the materials into a desired state of plasticization, but mixing of the materials passing through the torpedo is kept at a minimum to maintain distinct color patterns in the material.

During forward translation of the screw 34, the valve 104 may be opened to divert controlled amounts of pressurized fluid from the translational motors 42, 44 to the rotary motor 46. For example, fluid may be diverted at a rate sufficient to induce forward rotation of the screw, to compensate for material back-flow tendencies and facilitates the feeding of a full shot of material through the torpedo. In this fashion the overall efficiency of the injector is enhanced.

By way of example, in one test run of a screw injector, a standard extruder screw having an overall length of 42.42 inches and a 20:1 length-to-diameter ratio was used. A 2 inch long mottling smearhead of 1.812 inches diameter was placed on the screw nose. The screw was displaced rearwardly relative to the feed opening 80 by an amount which reduced the effective length-to-diameter ratio of the screw to approximately 15:1. A torpedo of 12 inches overall length was placed ahead of the screw, there being about a 6 inch clearance between the torpedo and the screw tip. A batch of 10 pounds white styrene-acrylonitrile polymer manufactured by the Monsanto Company of St. Louis, Mo, and commercially available under the designation LNA 21, and 0.01 pounds of maroon coloring concentrate manufactured by the Coz Chemical Company of Northbridge, Mass., and commercially available under the designation ANPS 517-C, was fed through the opening 80. A melt temperature of about 360° F provided a good mottle.

It will be understood that by providing methods and apparatus enabling mottled articles to be produced by a screw injector, the present invention enables certain benefits afforded by plasticizer screws, e.g., rapid and efficient heat transfer, to be realized in mottling operations without the accompaniment of otherwise expected disadvantages. Mottling operations can thus be conducted efficiently and conveniently with the type of equipment usually desired for carrying out other, more conventional, molding operations.

It will be understood, however, that in accordance with the principles of the present invention, a screw may be newly-fabricated so as to present a working channel dimensioned to soften, rather than completely plasticize, molding materials.

Although the invention has been described in connection with a preferred embodiment thereof, it will be appreciated by those skilled in the art that additions modifications, substitutions and deletions not specifically described may be made without departing from the spirit and scope of the invention as defined in the appended claims.

What is claimed is:

1. A method of molding an article of mottled appearance comprising the steps of:

introducing molding materials of different coloration into an injector housing bore containing a rotatable screw;

rotating said screw to advance said materials and discharge said materials from said screw in a softened condition which is short of a fully blended condition so that distinct color patterns are present;

heating a portion of said housing located ahead of said screw;

translating said screw forwardly to advance said softened materials toward said heated housing portion containing a spreader, so that the softened materials are spread outwardly and travel through a passage formed by said spreader in a direction parallel to the axis of said bore to facilitate melting and minimize mixing of said materials;

discharging said materials from a discharge opening of said housing in a fully melted condition but short of a fully mixed condition, so that distinct color patterns are present.

* * * * *